(12) United States Patent
Grover

(10) Patent No.: US 9,961,188 B2
(45) Date of Patent: May 1, 2018

(54) VEHICLE TO DEVICE COMMUNICATION OVER WIRED AUDIO CONNECTION

(71) Applicant: FORD GLOBAL TECHNOLOGIES, LLC, Dearborn, MI (US)

(72) Inventor: Joey Ray Grover, Madison Heights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 678 days.

(21) Appl. No.: 14/321,501

(22) Filed: Jul. 1, 2014

(65) Prior Publication Data
US 2016/0006858 A1 Jan. 7, 2016

(51) Int. Cl.
| G06F 13/20 | (2006.01) |
| H04M 1/725 | (2006.01) |
| G06F 13/38 | (2006.01) |
| H04M 1/60 | (2006.01) |

(52) U.S. Cl.
CPC ...... *H04M 1/72558* (2013.01); *G06F 13/385* (2013.01); *H04M 1/6083* (2013.01); *H04M 1/72527* (2013.01)

(58) Field of Classification Search
USPC .................................. 710/306–315, 104–111
See application file for complete search history.

(56) References Cited

U.S. PATENT DOCUMENTS

| 5,842,045 | A | 11/1998 | Nakamura | |
| 6,778,073 | B2* | 8/2004 | Lutter | G08G 1/166 |
| | | | | 340/10.1 |
| 8,447,598 | B2* | 5/2013 | Chutorash | G01C 21/3661 |
| | | | | 455/563 |
| 8,478,257 | B2* | 7/2013 | Oh | H04B 1/3822 |
| | | | | 455/414.2 |
| 8,626,427 | B2* | 1/2014 | Park | G01C 21/3635 |
| | | | | 123/41.12 |
| 8,649,756 | B2 | 2/2014 | Helm | |
| 8,713,212 | B1* | 4/2014 | Yoshinaga | G06F 13/426 |
| | | | | 710/16 |
| 8,866,604 | B2* | 10/2014 | Rankin | G06F 3/048 |
| | | | | 340/438 |
| 8,966,366 | B2* | 2/2015 | Tom | G06F 9/44505 |
| | | | | 348/836 |
| 9,098,367 | B2* | 8/2015 | Ricci | G06F 8/61 |
| 9,116,012 | B2* | 8/2015 | Hirai | G01C 21/3688 |
| 9,390,566 | B2* | 7/2016 | Taylor | G07C 5/00 |
| 2002/0120377 | A1* | 8/2002 | Totani | H04R 3/12 |
| | | | | 701/36 |
| 2002/0197954 | A1* | 12/2002 | Schmitt | H04M 1/6091 |
| | | | | 455/41.1 |
| 2006/0094349 | A1* | 5/2006 | Slesak | H04B 1/08 |
| | | | | 455/3.02 |
| 2010/0120366 | A1 | 5/2010 | DeBiasio et al. | |

(Continued)

*Primary Examiner* — Raymond Phan
(74) *Attorney, Agent, or Firm* — Jennifer M. Stec; Brooks Kushman P.C.

(57) ABSTRACT

A vehicle computing system comprising a vehicle auxiliary port and at least one controller. The controller configured to communicate with a nomadic device via a wired connection established between the vehicle auxiliary port and a nomadic device auxiliary port. The controller further configured to transmit data to the nomadic device over the wired auxiliary port connection. The data including one or more control commands for the nomadic device.

20 Claims, 5 Drawing Sheets

(56) References Cited

U.S. PATENT DOCUMENTS

| | | | |
|---|---|---|---|
| 2010/0269143 A1* | 10/2010 | Rabowsky | H04B 7/18591 |
| | | | 725/63 |
| 2011/0116642 A1* | 5/2011 | Hall | H04H 60/04 |
| | | | 381/58 |
| 2011/0128446 A1* | 6/2011 | Woo | B60K 35/00 |
| | | | 348/552 |
| 2011/0251705 A1 | 10/2011 | Takizawa | |
| 2012/0057078 A1* | 3/2012 | Fincham | H04N 5/57 |
| | | | 348/645 |
| 2013/0130743 A1 | 5/2013 | Lin | |
| 2013/0147616 A1* | 6/2013 | Lambert | G07C 5/008 |
| | | | 340/426.1 |
| 2014/0036127 A1 | 2/2014 | Pong et al. | |
| 2015/0033174 A1* | 1/2015 | Hisatsugu | B60K 37/06 |
| | | | 715/771 |
| 2015/0094957 A1* | 4/2015 | Hyde | B60L 11/182 |
| | | | 701/537 |

* cited by examiner

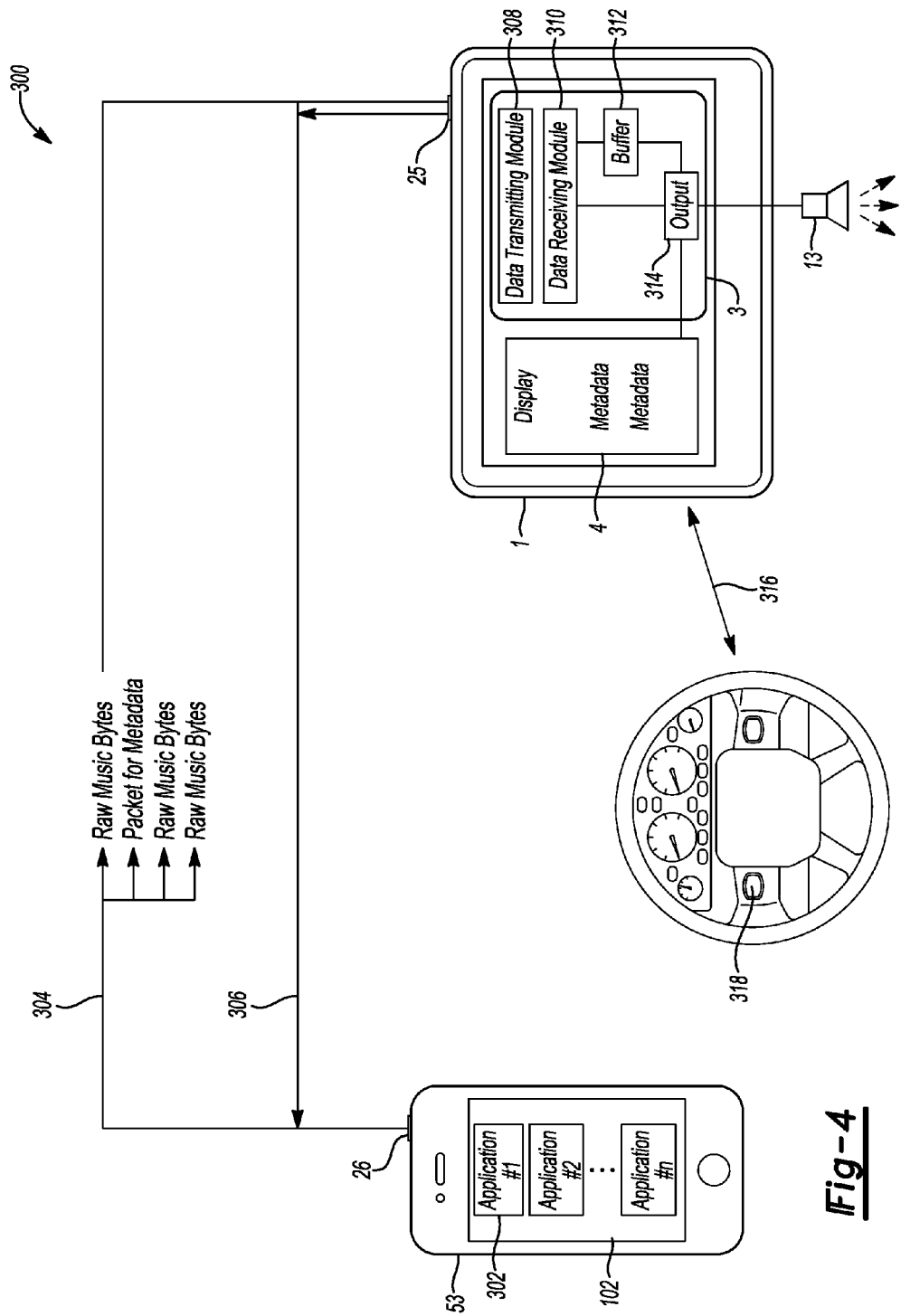

VEHICLE TO DEVICE COMMUNICATION OVER WIRED AUDIO CONNECTION

TECHNICAL FIELD

The present disclosure generally relates to vehicle infotainment systems, and more particularly, to systems and methods using an auxiliary port to communicate data.

BACKGROUND

U.S. Patent Application 2010/0120366 generally discloses a portable plug device for use in a vehicle is disclosed for enabling wireless transmissions from an audio source, such as an mp3 player or the like, to a head unit of a car stereo for reproduction of the audio content over speakers in the vehicle. The portable plug device includes a cord suitable for being attached to the auxiliary unit of the stereo head unit, or another location integrated in the vehicle which controls audio functions. In one configuration, the portable plug further includes a wireless transceiver for sending and receiving data and control signals to and from an audio source connected to a second wireless transceiver. The portable plug device can be used to receive control signals from the stereo equipment integrated in the vehicle so that an occupant can control features such as volume, skip track, pause and stop by using the audio controls integrated in the vehicle. In another configuration, the portable plug device includes a microphone to enable the occupant to have a telephone conversation hands free using a telephone compatible with the wireless standard implemented in the portable plug device. In still other implementations, an occupant can use the portable plug device to receive audio content, and if he or she receives an incoming call, the speakers are muted and the call is taken. After the call is taken, the occupant can resume listening to audio content from the audio source over the vehicle speakers.

U.S. Patent Application 2011/0251705 generally discloses an in-vehicle acoustic device capable of accurately controlling the operating state of a portable acoustic device with one button. An in-vehicle audio device serving as the in-vehicle acoustic device is equipped with an antenna which receives a signal indicating the streaming state of a portable audio device and a communication module which transmits operating instruction signals to the portable audio device according to operating signals from an operating unit. When the operating unit is operated and the portable audio device is streaming, the communication module transmits a stop instruction signal to stop playback operation by the portable audio device, and when the operation unit is operated and the portable audio device is not streaming, the communication module transmits a play instruction signal to start playback operation by the portable audio device. In addition, the in-vehicle audio device uses Bluetooth communication as the method for wireless communication between the in-vehicle audio device and the portable audio device.

U.S. Patent Application 2014/0036127 generally discloses a headphone system that may include a first speaker assembly, a second speaker assembly, and an interactive visual display system. The interactive visual display system includes a display operative to output visual contents according to interaction with a user. In a more particular embodiment, the headphone system includes an external device interface that enables a user to interact with the contents displayed from the screen via an external device or via the Internet. In another embodiment, the interactive visual display system is removable from the rest of the headphone system and can optionally be installed in another compatible non-headphone device.

SUMMARY

In a first illustrative embodiment, a vehicle computing system comprising a vehicle auxiliary port and at least one controller. The controller configured to communicate with a nomadic device via a wired connection established between the vehicle auxiliary port and a nomadic device auxiliary port. The controller further configured to transmit data to the nomadic device over the wired auxiliary port connection. The data including one or more control commands for the nomadic device.

In a second illustrative embodiment, a mobile device comprising at least one controller. The controller configured to communicate with a vehicle computing system (VCS) via a wired auxiliary port connection. The controller further configured to receive an application activation command from the VCS over the wired auxiliary port connection. The controller further configured to activate the mobile application responsive to the activation command.

In a third illustrative embodiment, an auxiliary port adapter comprising an upper terminal and a lower terminal. The upper terminal may be configured to receive a connector including an left input stereo terminal, an right input stereo terminal, and an microphone input terminal. The lower terminal may be configured to include an left output stereo terminal, an right output stereo terminal, and an microphone output terminal. The adapter may be configured to receive a signal over the right input stereo terminal or the left input stereo terminal, via the upper terminal and pass the signal to the microphone output terminal.

BRIEF DESCRIPTION OF THE DRAWINGS

FIG. 4 is an exemplary block topology of a system for communicating messages between the nomadic device and the vehicle computing system via the auxiliary port according to an embodiment.

DETAILED DESCRIPTION

Figure 1:
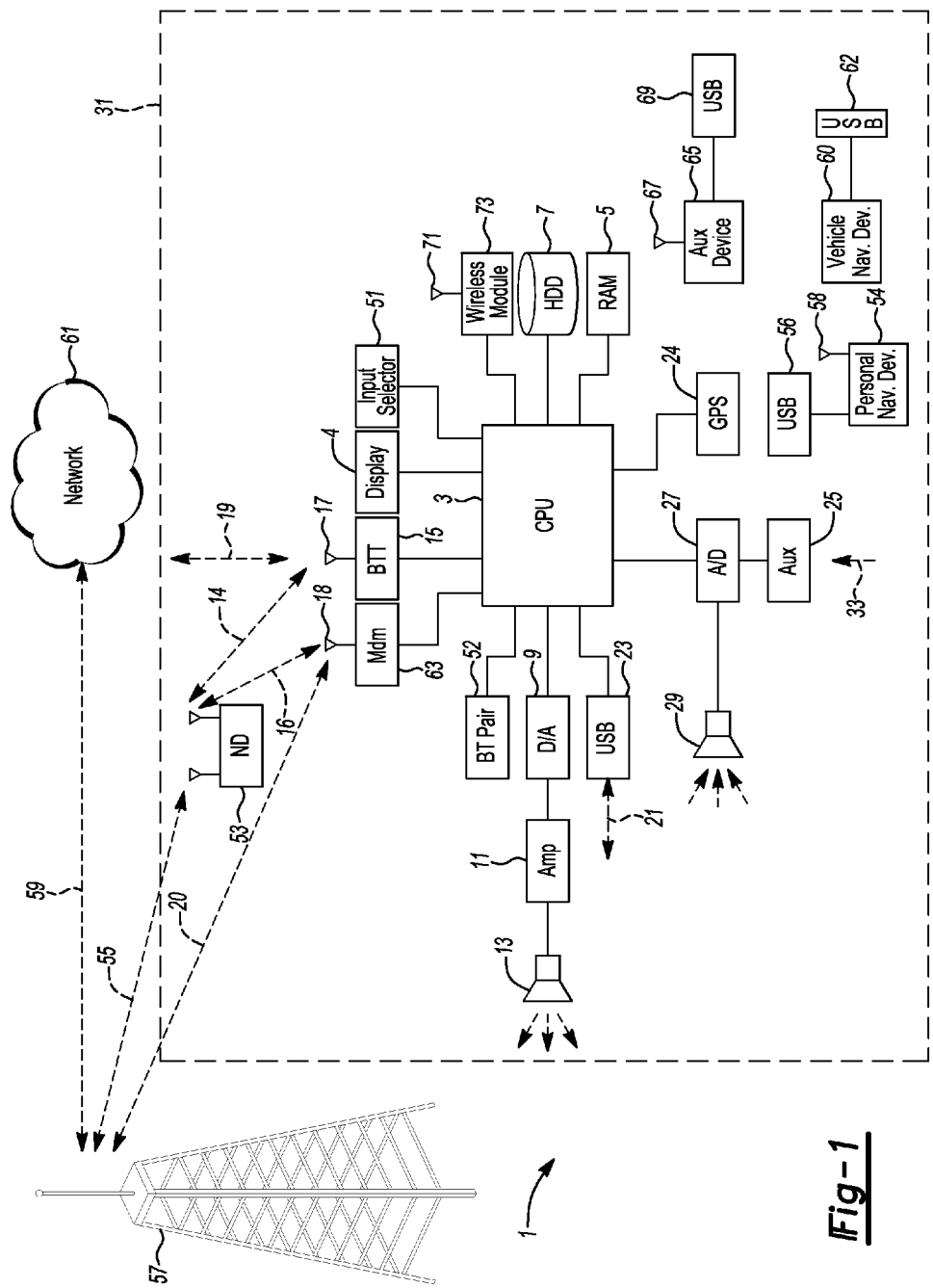
FIG. 1 is an exemplary block topology of a vehicle infotainment system implementing a user-interactive vehicle information display system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

A vehicle may include a computing system that is configured to allow a communication link between one or more devices (i.e., nomadic devices). The nomadic device may communicate with the vehicle computing system using wireless and/or wired technology. The communication link enables the vehicle computing system to connect to application(s) at the nomadic device. The information communicated via the application(s) between the vehicle computing system and the nomadic device may include internet radio, social media information, and/or navigation data. The applications may also include driver safety related information including, but not limited to, 24-Hour roadside assistance, 911 ASSIST™ and/or call center services.

This disclosure proposes a system and method for providing some sort of control at an infotainment console of the vehicle computing system by embedding control data in the actual music streaming from an auxiliary port (e.g., headphone jack) of the nomadic device via a wire connection coupled to the vehicle computing system. The data streaming from the nomadic device to the vehicle computer may be packetize data that may be used as command and control messages while the music data may be transmitted raw. The packets of data sent to the vehicle computer may be a standard protocol or a new one based on a need of control commands like play, pause, stop, next track, previous track, etc. For example, if using the existing communication protocol, the packet data could include raw music bytes with a packet for metadata.

The method and system of the vehicle computing system to manage stream data from the nomadic device via an auxiliary port may be disclosed in this document. The method and system may include one or more software algorithms executed at the hardware of the vehicle computing system and/or nomadic device. There are several embodiments to implement this disclosure including, but not limited to, a crossover cable having audio in and microphone channel hardwired in a switch position, and a plugin module used to insert between the nomadic device and the vehicle computing system for retrofitting earlier vehicle computing systems. This disclosure may allow the vehicle computing system to provide a means of receiving application data (e.g., media data) from the nomadic device using existing hardware including, but not limited to, the auxiliary port.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable universal serial bus (USB) drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. The auxiliary input 25 may include, but is not limited to, a general-purpose modular jack capable of receiving any one of modular plugs of different data terminals configured to receive the input 33. The general purpose modular jack may include, but is not limited to, a headphone jack (not shown). The input 33 may include, but is not limited to, an audio interface connector (not shown). An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output may also be made to a remote BLUETOOTH device such as PND 54 or a USB device such as vehicle navigation device 60 along the bi-directional data streams shown at 19 and 21 respectively. In one embodiment, an output may also be made via an auxiliary cable connected to a user's nomadic device 53 using the audio interface connector (i.e., input 33) coupled to the auxiliary input 25 (i.e., headphone jack) at the VCS 1.

In one illustrative embodiment, the system 1 uses the BLUETOOTH transceiver 15 to communicate 17 with the user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the nomadic device 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

In another embodiment, incoming data can be passed through the nomadic device via the auxiliary cable connection to a nomadic device auxiliary port (i.e., headphone jack) and the system's auxiliary input 25. The auxiliary cable enables the connection by using at least two contacts (i.e., the audio interface connector) at the respective ends of the auxiliary cable coupled to the nomadic device auxiliary port and the VCS auxiliary input 25.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2A:
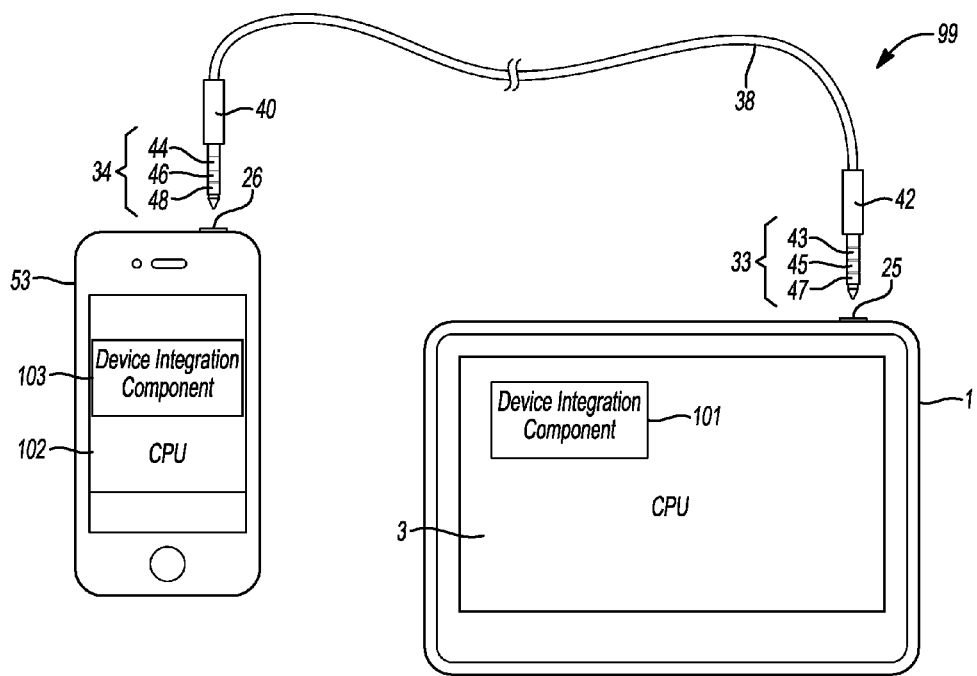
FIGS. 2A-2B are exemplary block topologies of a system for integrating a nomadic device with the vehicle computing system via an auxiliary port according to an embodiment.

FIG. 2A is an exemplary block topology of a system 99 for integrating a nomadic device 53 with the vehicle computing system 1 via an auxiliary port 25, 26 according to an embodiment. The CPU 3 may be in communication with one or more transceivers. The one or more transceivers may be capable for wired and wireless communication for the integration of one or more devices. For example, the one or more transceivers may include the USB connector 23 and/or the auxiliary port 25 (e.g., headphone jack). To facilitate the integration, the CPU 3 may include a device integration framework 101 configured to provide various services to the connected device(s). These services may include transport routing of messages between the connected device(s) and the CPU 3, global notification services to allow the connected device(s) to provide alerts to the user, application launch and management facilities to allow for unified access to applications executed by the CPU 3 and those executed by the connected device(s), accident detection notification (i.e., 911 ASSIST™), and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 (e.g., smartphone) to take advantage of the services provided by the device integration framework 101. The device integration client component 103 may be referred to as an application. The application is executed on hardware of the nomadic device 53. The application may communicate data from the nomadic device 53 to the VCS 1 via the nomadic device auxiliary port 26 (e.g., headphone jack).

The connection between the nomadic device 53 and VCS 1 may be established via an auxiliary cable 38 having two auxiliary port connectors 40, 42, e.g., without limitation, such as those commonly used to transmit audio information. The auxiliary port connectors 40, 42 may be configured to couple to the nomadic device auxiliary port 26 and the VCS auxiliary port 25. For example, without limitation, the auxiliary port connector 40 coupled to the nomadic device auxiliary port 26 may include an auxiliary interface plug 34 comprising a left stereo terminal 44, a right stereo terminal 46, and a microphone terminal 48. In this embodiment, the auxiliary interface plug 34 comprises a left stereo output 44, a right stereo output 46, and a microphone input 48. The auxiliary port connector 42 coupled to the VCS 1 may include an auxiliary interface plug 33 comprising a left stereo terminal 43, a right stereo terminal 45, and a microphone terminal 47. In this embodiment, an auxiliary interface plug 33 comprises a left stereo input 43, a right stereo input 45, and a microphone output 47. It must be noted that the auxiliary port connectors 40, 42 may comprise the same configuration such that they are interchangeable. For example, the auxiliary port connectors 40, 42 may establish communication between the nomadic device 53 and VCS 1 no matter which connector is coupled to the nomadic device auxiliary port 26 and vehicle computing system auxiliary port 25.

Figure 3A:
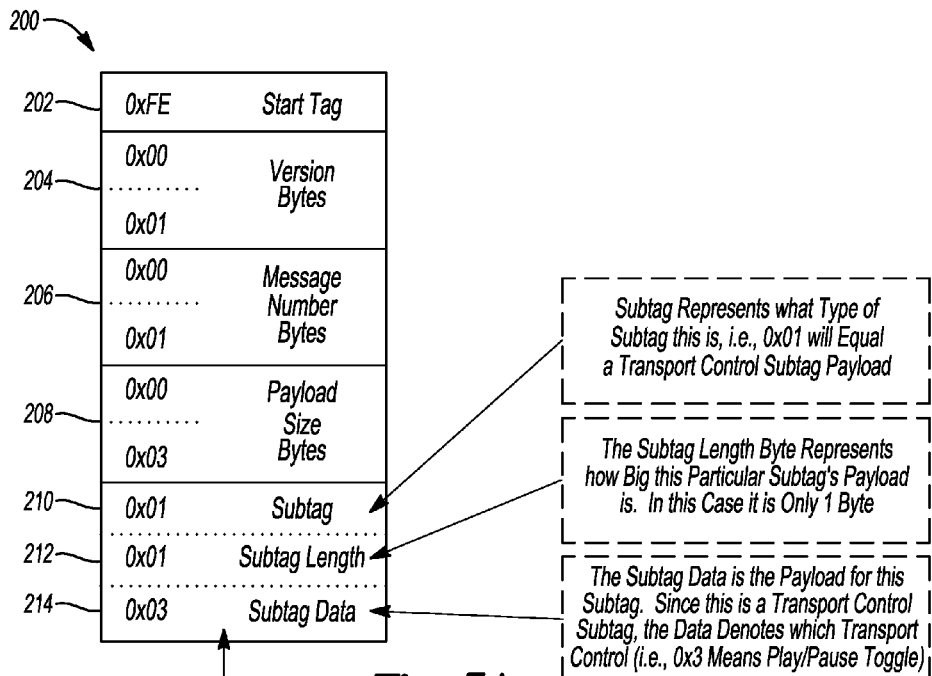
FIG. 3A is an exemplary protocol format for one or more messages communicating between the nomadic device and vehicle computing system.

The nomadic device 53 may transmit one or more data packets to the VCS 1 via the auxiliary cable 38 connection having at least two auxiliary port connectors 40, 42. The data packet may have a protocol message sent from the nomadic device 53 via either the left stereo output 44 or the right stereo output 46 alongside the music data. The protocol messages will be discussed in further detail in FIG. 3.

The one or more transceivers may include a multiport connector hub (not shown). The multiport connector hub may be used to interface between the CPU 3 and additional types of connected devices other than the nomadic devices 53. The multiport connector hub 102 may communicate with the CPU 3 over various buses and protocols, such as via USB, and may further communicate with the connected device(s) using various other connection buses and protocols, such as Serial Peripheral Interface Bus (SPI), Inter-integrated circuit (I2C), and/or Universal Asynchronous Receiver/Transmitter (UART). The multiport connector hub may further perform communication protocol translation and interworking services between the protocols used by the connected devices and the protocol used between the multiport connector hub and the CPU 3. The connected device(s) may include, as some non-limiting examples, a radar detector (not shown), a global position receiver device (not shown), and a storage device (not shown).

Figure 2B:
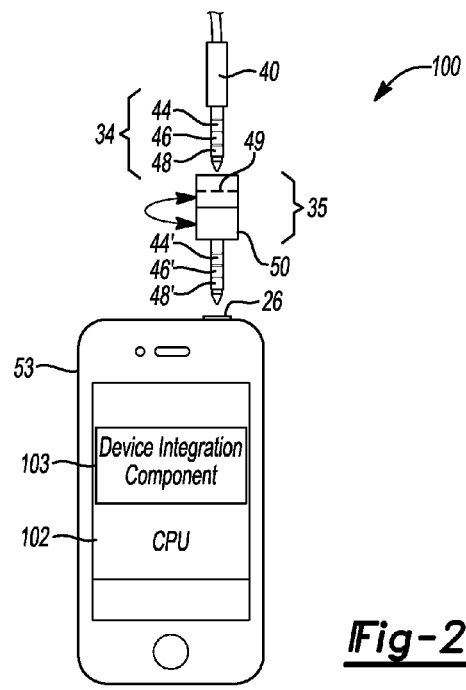

FIG. 2B is an exemplary block topology of a system 100 for integrating a nomadic device 53 with the vehicle computing system 1 via an adapter 35 configured to couple with the auxiliary port 26 according to an embodiment. The adapter 35 may comprises an upper terminal 49 and a lower terminal 50. The adapter 35 may be configured to receive the auxiliary interface plug 34 of the auxiliary port connecter 40 comprising the left stereo output 44, the right stereo output 46, and the microphone input 48. The adapter 35, having the auxiliary interface plug 34 connected, may be coupled to the nomadic device auxiliary port 26.

The adapter 35 may be a pass-through device configured to move the right stereo output 46 to the microphone input 48 terminal of the auxiliary interface plug 34 by transmitting the data from the upper terminal 49 to the lower terminal 50. The adapter 35 may then tie the left stereo output 44 to the right stereo output 46. The adapter 35 is configured so that the nomadic device 53 may receive signals from the VCS 1 using a standard two wire configuration auxiliary cable 38. The adapter 35 enables the nomadic device 53 to transmit protocol message to the VCS 1 via the left stereo output channel 44. The adapter 35 enables the nomadic device 53 to receive protocol messages from the VCS 1 via the right stereo output 48. The messages may be received at the right stereo output 48 and transmitted to the microphone input 48 via the adapter 35.

For example, the VCS 1 may transmit a message to the nomadic device 53 using the right stereo input terminal 45 via the auxiliary port connector 42. The nomadic device auxiliary port connector 40 may receive the message (i.e., one or more signals) from the VCS 1 at the right stereo output 46. The adapter 35 may receive the message at the right stereo output 46 and transfer it to the microphone input 48. The adapter 35 may receive the message at the upper terminal 49 via the right stereo output 46 terminal and transfers the data to the lower terminal 50 such that the data is communicated on the microphone input 48. The adapter 35 allows a VCS 1 message protocol to be received by the nomadic device 53.

In another embodiment, the adapter 35 may comprise a plug and a housing configured to receive an auxiliary interface plug 34. The plug may include an updated left stereo output 44', an updated right stereo output 46', and an updated microphone input 48'. For example, the adapter 35 may receive one or more signals from the auxiliary interface plug via the left stereo output 44, the right stereo output 46, and the microphone input 48. The adapter may transfer the one or more signals to one or more terminals. The adapter may transmit the transferred signals to the nomadic device 53 via the updated left stereo output 44', the updated right stereo output 46', and the updated microphone input 48'.

In another embodiment, the adapter 35 may include a processor configured to analyze the one or more signals being received from the auxiliary interface plug 34. For example, the processor may determine whether the signal is intended to be transmitted through the right stereo output, the left stereo output, and the microphone input. In another example, the processor may receive one or more signals that may include header information to instruct the processor where to send the data.

FIG. 3 is an exemplary protocol format for one or more messages communicating between the nomadic device 53 and the vehicle computing system 1. The protocol format may be transmitted via the auxiliary port 26 (e.g., headphone jack) of the nomadic device 53 to the auxiliary port 25 (i.e., headphone jack, USB, etc.) of the VCS 1. The message protocol packet 200 may include more than one subtag at a time. The subtags may also have the ability to be nested, enabling the messages to be transmitted form the VCS 1 without relying on prior exchanges from the nomadic device 53.

The message protocol packet 200 may include, but is not limited to, a start tag 202, a message version 204, a message number 206, a payload size, and subtag information 210, 212, 214. The subtag information may include, but is not limited to, a type 210, a length 212, and payload size of the data 214. For example, the subtag type 210 may represent a transport control subtag payload. For this example, the transport control subtag may have a subtag length 212 of one byte. The subtag data 214 for the transport control subtag may include command data transmitted from the VCS 1 to the nomadic device 53. The command data may include control instruction for the one or more applications executed on hardware at the nomadic device 53. Continuing from the transport control subtag example, the subtag data may include, but is not limited to, whether the VCS 1 is transmitting a request to play/pause the music data being transmitted. In another example, the subtag information may include embedded subtags (e.g., sub-subtags). The embedded subtags (sub-subtags) may be transmitted with payload data having the type of subtag, length, and/or data.

Figure 3B:
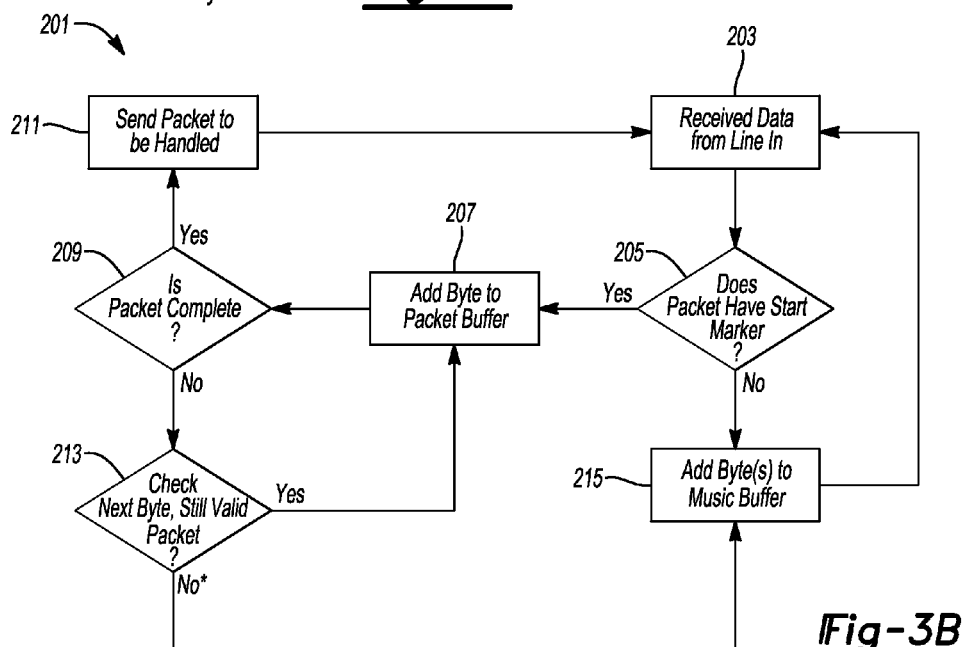
FIG. 3B is a flow chart illustrating an example method of a message being communicated between the nomadic device and vehicle computing system via the auxiliary port.

FIG. 3B is a flow chart illustrating an example method 201 of a message being communicated between the nomadic device 53 and VCS 1 via the auxiliary port connectors 40, 42. The method 201 may be implemented using software code contained within the VCS 1 and/or the nomadic device 53. In other embodiments, the method 201 may be implemented at the VCS 1, at the nomadic device 53, distributed amongst multiple vehicle controllers, and/or a combination thereof.

In operation 203, the VCS 1 may receive data via a hard wire connection using the auxiliary port 25 of the VCS 1 and the auxiliary port 26 (e.g., headphone jack) of the nomadic device 53. The VCS 1 may determine if the received data has a message protocol including a packet start marker in operation 205.

In operation 207, if the data has the packet start marker, the VCS 1 may add one or more bytes to a packet buffer. If the packet is complete, the VCS 1 may send the packet for execution by the respective system in communication within the VCS 1. For example, if the packet was determined to be one containing metadata, more specifically a song title, the VCS 1 may then process the data into text, route it to a user interface handlers, and output the song title at a display.

In operation 215, if the received data from the nomadic device 53 does not have a packet start marker, the VCS 1 may add byte(s) to buffer the data. For example, if music data is being received by the VCS 1 and there is no start marker, the VCS 1 may add byte(s) to a music buffer. The VCS 1 may continue to receive additional data from the nomadic device 53.

In operation 213, if the packet is incomplete, the VCS 1 may check the next byte to determine if the packet is still valid. If the packet is still valid, the VCS 1 may continue to add a byte to the packet buffer in operation 207. If the VCS 1 determines that the packet may be invalid, the system may add the entire packet buffer to the music buffer as a precaution to ensure a false positive was flagged by the system. For example, if a potential packet buffer makes it to the step of buffering a message number but notices the message number is invalid, the VCS 1 may take all bytes buffered for this purpose and add them to the music buffer instead. It may be assumed that all data is sent serially, so when invalid data is processed it typically may mean that the buffer is not actually a packet, but just part of the music data. The system may encounter this because there are only a finite matter of byte combinations.

FIG. 4 is an exemplary block topology of a system 300 for communicating messages between the nomadic device 53 and the vehicle computing system 1 via the auxiliary port 25, 26 according to an embodiment. The nomadic device 53 may transmit data from one or more applications 302 to the VCS 1 using at least one of the auxiliary interface plug comprising one or more terminals. For example, the nomadic device 53 may transmit data through the auxiliary interface plug coupled to the nomadic device auxiliary port 26 and comprising terminals including, but not limited to, the left stereo output, the right stereo output, and the microphone input. The data may be formatted in a protocol message recognized by the VCS 1.

In another example, the nomadic device 53 may transmit a sine frequency via the auxiliary interface plug. The sine frequency may comprise two start bits, eight data bits, one check bit and one stop bit, so as to facilitate to a data receiving module 310 at the VCS 1 to recognize the data. The nomadic device 53 may have a data transmitting module (not shown) to transform the data to be transmitted into the signal with different frequencies.

The nomadic device 53 may transmit a message protocol 304 comprising raw music bytes and metadata to the VCS 1. The VCS 1 may receive the message protocol 304 via the auxiliary port 25. The VCS 1 may comprise one or more controllers (i.e., CPU 3) configured to communicate with a data transmitting module 308, a data receiving module 310, and/or an encryption module (not shown).

For example, the data transmitting module 308 may electrically connect to the microphone output terminal 47 and/or the right stereo terminal 45 so as to transmit data 306 to the nomadic device 53. The data receiving module 310 may electrically connect the left stereo input 43 and the right stereo input 45 so as to receive the message protocol from the nomadic device 53. The encryption module may electrically connect with the data transmitting module 308 and the data receiving module 310 and stored with a key and a digital certificate.

In one example, the VCS 1 may receive the message protocol 304 transmitted from the nomadic device 53. The data receiving module 310 may process the message protocol 304 and determine whether the data should be sent to a buffer module 312 for output at a preconfigured delayed time. The data receiving module 310 may transmit data to an output module 314. The output module 314 may transmit the data to several components, including, but not limited to, a display 4 and/or a speaker 13.

The nomadic device 53 may transmit a data to execute one or more applications to the VCS 1 via the one or more terminals at the auxiliary interface plug. The VCS 1 may transmit one or more commands to the nomadic device via the microphone terminal of the auxiliary interface plug. In another embodiment, the nomadic device may transmit one or more command message to the VCS via the auxiliary interface plug. For example, the nomadic device 53 may transmit volume control to the VCS 1 via the auxiliary port.

The VCS 1 may receive one or more control commands from user interface controls to manage the one or more applications 302 at the nomadic device 53. The user interface controls may include, but is not limited to steering wheel controls 318, a microphone (not shown) configured with the VCS to receive voice commands, and center stack controls (not shown). The steering wheel controls 318 may be configured with the VCS to transmit 316 one or more command messages to control the application 302 being executed at the nomadic device 53.

For example, the nomadic device 53 may execute an internet radio application to transmit raw music bytes with packets for metadata to the VCS 1 via a message protocol 304. The VCS 1 may execute/output the received data from the nomadic device 53 and/or buffer portions of the received data for delayed output/execution.

In another example, the nomadic device 53 may execute a navigation application to transmit raw destination data bytes with packet for metadata to the VCS 1 via the message protocol 304. The VCS 1 may execute/output the received data from the nomadic device 53 and/or buffer portion of the received navigation data for delayed output/execution. For example, turn-by-turn instructions may be buffered by the VCS 1 until the vehicle gets closer to the turn.

The steering wheel controls 318 may receive a request to "Pause" the internet radio based on a user input. The VCS 1 may transmit the "Pause" request in a data packet 306 to the nomadic device 53 via the audio interface connection.

Figure 5:
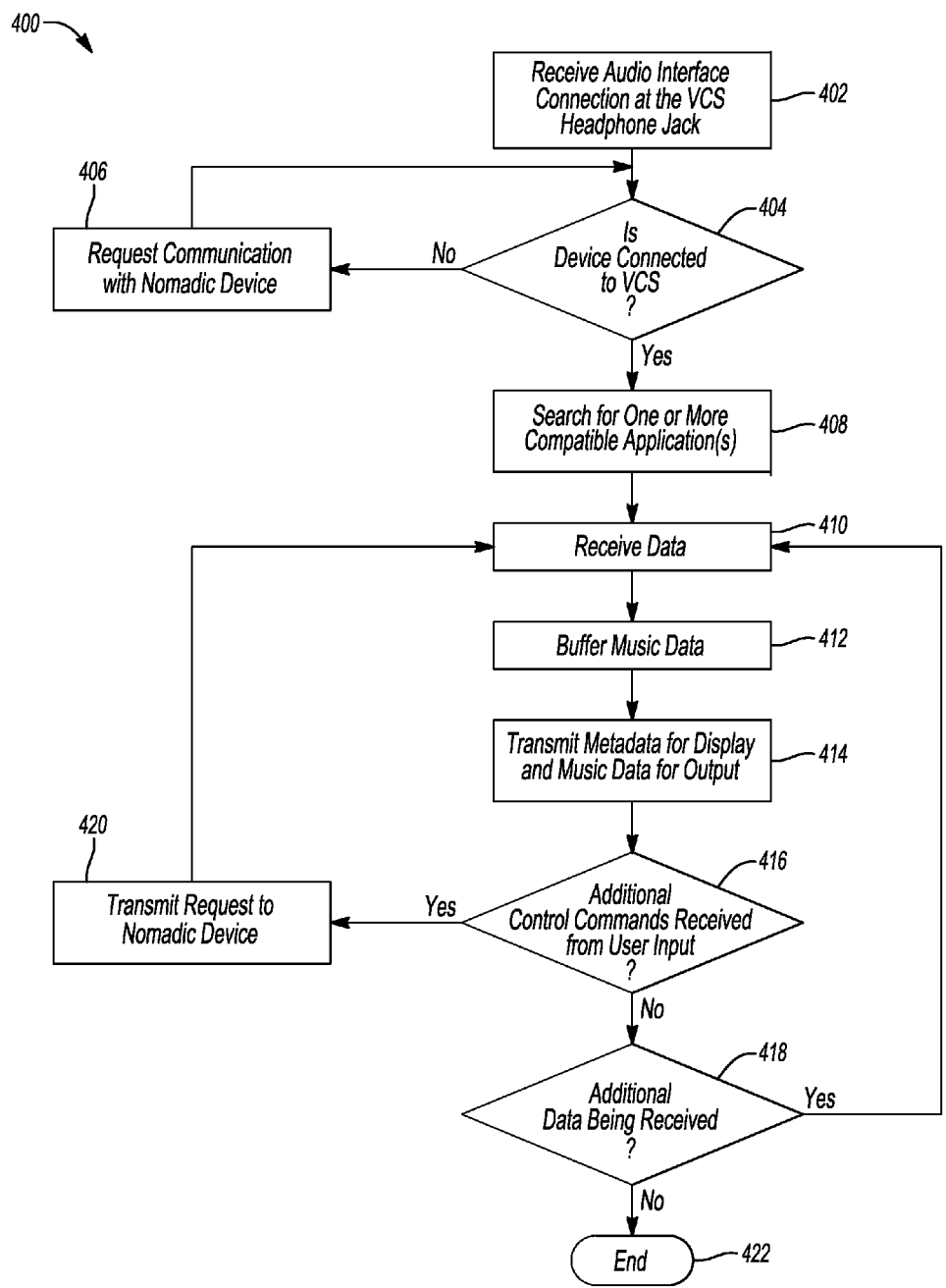
FIG. 5 is a flow chart illustrating an example method of the vehicle computing system communicating one or more commands to the nomadic device via the auxiliary port connection according to an embodiment.

FIG. 5 is a flow chart illustrating an example method 400 of the vehicle computing system communicating one or more commands to the nomadic device 53 via the auxiliary port 25, 26. The method 400 may be implemented using software code contained within the VCS 1. In other embodiments, the method 400 may be implemented in other vehicle controllers, at the nomadic device 53, distributed amongst multiple vehicle controllers, and/or a combination thereof.

Referring again to FIG. 5, the vehicle and its components as illustrated in FIG. 1, FIG. 2A, FIG. 2B, FIG. 3A, and FIG. 3B are referenced throughout the discussion of the method to facilitate understanding of various aspects of the present disclosure. The method 400 of communicating with an application at the nomadic device 53 via the auxiliary port with the VCS 1 may be implemented through a computer algorithm, machine executable code, or software instructions programmed into a suitable programmable logic device(s) of the vehicle, such as the vehicle control module, the nomadic device control module, another controller in communication with the vehicle computing system, or a combination thereof. Although the various operations shown in the flowchart diagram 400 appear to occur in a chronological sequence, at least some of the operations may occur in a different order, and some operations may be performed concurrently or not at all.

In operation 402, the VCS 1 may receive an auxiliary interface connection via a wired connection using the auxiliary interface connecter coupled to the nomadic device auxiliary port 26. The VCS 1 may transmit one or more protocol message to determine if the nomadic device 53 is connected and in communication with the VCS 1 in operation 404.

In operation 406, the VCS 1 may transmit one or more initialization messages to the nomadic device 53. The one or more initialization messages may include, but is not limited to, requesting communication with the nomadic device 53, determining if the nomadic device 53 is configured to communicate with the VCS 1, and/or a combination thereof.

In operation 408, the VCS 1 may transmit and/or receive data to/from the nomadic device 53 to determine whether an application is compatible with the VCS 1, querying what applications are launched at the nomadic device 53, and/or a combination thereof. The VCS 1 may receive at least a portion of data from the one or more application being executed at the nomadic device 53 in operation 410.

In operation 412, the VCS 1 may determine whether to execute, output, and/or buffer the data received from the nomadic device 53. For example, the nomadic device 53 may transmit navigation data with metadata, therefore may buffer the navigation data such that the metadata may be received without interruption of the navigation data. Once the VCS 1 receives the data, and/or processes the received data, the VCS 1 may output the metadata for display and navigation data for output at one or more speakers in operation 414.

In operation 416, the VCS 1 may receive one or more messages based on control commands via a user input. The control commands may come from a touch screen display, one or more hard control buttons, the steering wheel controls, voice commands, and/or a combination thereof. If a control command is received by the VCS 1, the system may transmit the request to the nomadic device 53 for execution.

In operation 418, the VCS 1 may receive additional data from the one or more applications being executed at the nomadic device 53. The VCS 1 may discontinue communication with the nomadic device 53 based on several factors including, but not limited to, the nomadic device 53 disconnecting the communication connection, and/or the VCS 1 being requested to power-down in operation 422.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle computing system comprising:
a vehicle headphone jack; and
at least one controller configured to:
   communicate with a nomadic device via a wired headphone jack connection established between the vehicle headphone jack and a nomadic device headphone jack; and
   transmit packetized data to the nomadic device over the wired headphone jack connection, the data including one or more control commands for the nomadic device.

2. The vehicle computing system of claim 1, wherein the controller is further configured to receive metadata from the nomadic device over the wired headphone jack connection, the meta-data providing information relating to a main data stream from the nomadic device.

3. The vehicle computing system of claim 1, wherein the one or more commands is a control function via an application protocol interface of one or more applications at the nomadic device.

4. The vehicle computing system of claim 1, wherein the wired connection communication is a protocol comprising a pattern of signal input and output that coincides with the nomadic device and the at least one controller.

5. The vehicle computing system of claim 1, wherein the vehicle headphone jack is configured to receive a connector comprising at least one of a left stereo terminal, a right stereo terminal, a microphone terminal.

6. The vehicle computing system of claim 2, wherein the data stream is music bytes.

7. The vehicle computing system of claim 2, wherein the metadata is at least one of song title, duration of song, and album information.

8. The vehicle computing system of claim 3, wherein the control function is at least one of play, pause, and skip commands.

9. The vehicle computing system of claim 3, wherein the vehicle headphone jack is configured to provide a power source to the nomadic device via the wired connection between the vehicle headphone jack and the nomadic device headphone jack.

10. A mobile device comprising:
at least one controller configured to:
   communicate with a vehicle computing system (VCS) via a wired headphone jack connection;
   receive an application activation command as packetized data from the VCS over the wired headphone jack connection; and
   activate the mobile application responsive to the activation command.

11. The mobile device of claim 10, wherein the at least one controller is further configured to transmit data based on the mobile application via the wired headphone jack connection.

12. The mobile device of claim 10, wherein the at least one controller is further configured to receive one or more control commands from a vehicle computing system via the wired headphone jack connection.

13. The mobile device of claim 10, wherein the wired headphone jack connection is configured to receive a connector comprising at least one of a left stereo terminal, a right stereo terminal, and a microphone terminal.

14. The mobile device of claim 11, wherein the data is metadata providing information relating to a main data stream from the mobile application.

15. The mobile device of claim 14, wherein the main data stream is navigation information comprising at least one of audio directions and display directions.

16. The mobile device of claim 12, wherein the one or more control commands is a control function via an application protocol interface of one or more applications.

17. The mobile device of claim 16, wherein the control function is at least one of destination input, route opinions, and other traffic data.

18. An auxiliary port adapter comprising:
an upper terminal, configured to receive a connector including a left input stereo terminal, a right input stereo terminal, and a microphone input terminal; and
a lower terminal, including a left output stereo terminal, a right output stereo terminal, and a microphone output terminal, wherein the adapter is configured to:
receive a packetized control signal interleaved with raw audio over the right input stereo terminal or the left input stereo terminal, via the upper terminal and pass the signal to the microphone output terminal.

19. The auxiliary port adapter of claim 18, wherein the adapter further includes a processor configured to:
differentiate between received signals intended for a right output stereo terminal, a left output stereo terminal and a microphone output stereo terminal; and
pass the received signals to intended output terminals based on the differentiation.

20. The auxiliary port adapter of claim 19, wherein differentiation is performed based on header information included with the signals.

* * * * *